UNITED STATES PATENT OFFICE.

ROBERT A. FISHER, OF PHILADELPHIA, PENNSYLVANIA, ASSIGNOR OF ONE-HALF TO G. T. LEWIS, OF SAME PLACE.

SIZING FOR PAPER-MAKERS' USE.

SPECIFICATION forming part of Letters Patent No. 266,452, dated October 24, 1882.

Application filed September 26, 1882. (Specimens.)

*To all whom it may concern:*

Be it known that I, ROBT. A. FISHER, of the city and county of Philadelphia, and State of Pennsylvania, have invented a new and Improved Sizing for Paper-Makers' Use and a Process of Making the Same; and I hereby declare the following to be a full, clear, and exact description thereof, sufficient to enable those skilled in the art to practice my invention.

Up to the present time the various aluminous compounds used as sizing by paper-makers have been put upon the market in the solid form. To produce these substances in the solid form, as a rule, adds very much to the expense of production, while it does not confer a corresponding benefit upon the consumer. In general use these aluminous sizings must either be dissolved in water in a separate vessel before using or put into the pulping-engine in a solid condition. In the latter case a considerable length of time must elapse before the material dissolves to a degree to produce the desired sizing effect.

The object of my invention is to produce a sizing for paper-makers' use, being an aluminous compound, which shall have a desirable percentage of sizing capacity or effect, and at the same time be in the most desirable condition for ready and immediate use by paper-makers without manipulation or treatment.

My invention consists, first, in a process for preparing sulphate of alumina, whereby at ordinary temperatures it remains in a viscid or creamy condition; and, secondly, in a sulphate of alumina in a viscid or creamy condition, as a new article of manufacture.

In order that those skilled in the art may make and use my invention, I will proceed to describe the manner in which I have carried it out.

Following the usual methods, I first prepare a solution of sulphate of alumina by the action of sulphuric acid upon clay or any other suitable mineral or artificial product containing alumina. The relative proportions of the aluminous material and sulphuric acid required, and the proper temperature at which the chemical reaction of the substances should take place, will of course vary with every different kind of aluminous material, and can be accurately determined only by trial. It may, however, be stated in general terms that every unit of the aluminous material will require about twice its weight of sulphuric acid at 50° Baumé. After the chemical action of the acid is finished a sufficient quantity of cold water is added to reduce the density of the solution to about 26° Baumé. The solution is then allowed to settle until any silicious or other insoluble matter has settled. The clear liquor is then drawn off into storage-tanks or an evaporator, where the liquor is concentrated by evaporation. The concentration should be carried to about 37° Baumé when boiling; but the exact degree may be varied slightly, according to circumstances. After the proper degree of concentration has been attained, the solution is run or siphoned off into suitable coolers, where it is cooled to a temperature of about 120° Fahrenheit, and when thus far cooled it is agitated by any desirable means until the temperature falls to about 80° Fahrenheit, when it will be found to have assumed a viscid consistency, and will so remain in all ordinary temperatures. This viscid or creamy sulphate of alumina is handled with great facility by paper-makers, and many desirable qualities not existing in other sizing-alums in their present merchantable forms. Other methods may be followed for producing the viscous or creamy condition, such as allowing the concentrated compound to cool and harden and then passing it through rolls or running cold water into the warm solution; but I prefer the method hereinbefore described in detail.

Having thus described my invention, what I claim as new, and desire to secure by Letters Patent, is—

1. The process for the manufacture from substances containing alumina of a sizing material for paper-makers, consisting essentially in first producing a solution of sulphate of alumina, evaporating said solution to about 37° Baumé when boiling, and then cooling under agitation, substantially as and for the purpose described.

2. As a new article of manufacture, a sizing for paper-makers' use, consisting of sulphate of alumina of a viscous or creamy consistency, substantially as set forth.

R. A. FISHER.

Witnesses:
R. K. EVANS,
H. B. APPLEWHAITE.